(12) United States Patent
Sullivan

(10) Patent No.: US 8,783,077 B2
(45) Date of Patent: Jul. 22, 2014

(54) PORTABLE TRUING DEVICE FOR SPOKED WHEELS AND METHOD OF USE

(76) Inventor: Christopher Robert Sullivan, Bend, OR (US)

( * ) Notice: Subject to any disclaimer, the term of this patent is extended or adjusted under 35 U.S.C. 154(b) by 814 days.

(21) Appl. No.: 12/948,725

(22) Filed: Nov. 17, 2010

(65) Prior Publication Data

US 2011/0239727 A1    Oct. 6, 2011

Related U.S. Application Data

(60) Provisional application No. 61/281,372, filed on Nov. 17, 2009.

(51) Int. Cl.
*G01B 5/24* (2006.01)
*B21C 51/00* (2006.01)

(52) U.S. Cl.
USPC ............... 72/31.02; 72/704; 72/705; 33/203; 33/203.18; 33/203.19

(58) Field of Classification Search
USPC ......... 72/704, 705, 31.01, 31.02, 31.03, 31.1, 72/293, 316, 318, 308, 304, 309; 33/203, 33/203.18, 203.19
See application file for complete search history.

(56) References Cited

U.S. PATENT DOCUMENTS

| | | | | | |
|---|---|---|---|---|---|
| 621,153 | A | * | 3/1899 | Schmidt | 33/203.19 |
| 1,073,042 | A | * | 9/1913 | Heller | 33/203.19 |
| 1,450,518 | A | * | 4/1923 | Schwartz | 33/203.19 |
| 3,956,829 | A | * | 5/1976 | Moxon | 33/203.19 |
| 5,243,765 | A | * | 9/1993 | Lynch | 33/203.19 |
| 5,539,988 | A | * | 7/1996 | Braun | 33/203.19 |
| 6,726,314 | B2 | * | 4/2004 | Van Roy | 347/85 |
| 2011/0255303 | A1 | * | 10/2011 | Nichol et al. | 362/606 |

* cited by examiner

*Primary Examiner* — Edward Tolan
*Assistant Examiner* — Pradeep C Battula
(74) *Attorney, Agent, or Firm* — Patent Ingenius LLC; Scott Evan Gilbert

(57) ABSTRACT

A portable tool designed for effective and efficient lateral truing of damaged spoked wheels, in particular bicycle wheels, is described. The tool is mountable on the bicycle frame, and allows the user to position the truing gauge with four spatial degrees of freedom. The inventive tool features a non-rigidly mounted (floating) truing indicator tip to maintain accurate tool alignment when in contact with a rotating wheel rim that is severely bent out the of the plane of the rim by decoupling rim forces from the rest of the tool. In addition, the combination of the floating action of the truing tip and its construction from a soft polymeric material avoids scratching or otherwise marring the surface of the rim during the truing procedure.

6 Claims, 5 Drawing Sheets

PORTABLE TRUING DEVICE FOR SPOKED WHEELS AND METHOD OF USE

CROSS-REFERENCE TO RELATED APPLICATIONS

This patent application claims the priority of U.S. Provisional Patent Application Ser. No. 61/281,372, filed on Nov. 17, 2009, and subject matter of which is incorporated herewith.

FIELD OF THE INVENTION

This invention relates to spoked wheel truing devices, in particular portable vehicle (bicycle) mountable tools for use by bicyclists in the field for rapid and effective repair of laterally un-true wheel rims resulting from damage to the wheel.

BACKGROUND

A bicycle's wheels are held straight, or true, by even tension on the spokes pulling from the hub of the wheel to the rim. A good wheel must have enough equal tension on the spokes pulling from each side of the hub to the rim in order for the wheel to stay straight, or true, under pedal loads and in the event of a blow to the wheel.

When the wheel has been well used, or a blow has been impacted to the wheel, the wheel will then develop a wobble, which is then said to be an "un-true wheel". To fix an un-true wheel it is required to re-tension the spokes in an appropriate fashion, which will pull the rim back into place. In order to correct the right spoke tension an indicator must be made on the area of the rim, which is out of true.

The operation of truing a wheel traditionally requires the use of a truing stand, which is a bench-top stand typically used in a bicycle repair shop or bicyclist's garage. Use of a truing stand requires that the wheel must be removed from the bicycle and installed into the truing stand. However, as trail and mountain bicycling has gained in popularity, damage to bicycle wheels occurs frequently while riding in rugged terrain. This poses a major inconvenience to mountain or road cyclists with damaged wheels in the field as the bicycle can no longer be ridden, ending the outing, and then the task must be undertaken of walking or carrying the bicycle to a vehicle that can transport it to a bicycle repair shop, not to mention the cost of the repair.

Those skilled in the art will appreciate that a very useful tool for the mountain or trail bicyclist, and even for the road cyclist, therefore would be a portable truing tool that is compact, light-weight and easy to transport while riding with minimal gear, and simple to use, thus allowing truing repairs to be done in the field in minutes by one with rudimentary repair skills. Portable truing tools for this purpose have been described in the patent literature, but have flawed designs that have prevented them from being successfully brought to market. Such earlier designs have never materialized in the form of commercially-available portable truing tools for bicycles in recent memory. Examples of earlier frame-mountable truing tools designed for bicycle wheels and other uses of spoked wheels include U.S. Pat. No. 640,607 to Wardwell, U.S. Pat. No. 1,073,042 to Heller, U.S. Pat. No. 1,450,518 to Schwartz, U.S. Pat. No. 3,956,829 to Moxon, U.S. Pat. No. 5,201,782 to Bartlett, U.S. Pat. No. 5,243,765 to Lynch, U.S. Pat. No. 5,193,283 to Hsiao, and U.S. Pat. No. 5,539,988 to Braun. These cited tools have basic drawbacks that render them inefficient and unwieldy. The common drawbacks are limited spatial maneuverability of the tool to align the truing gauge portion of the tool next to the wheel rim, a fixed gauge indicator, being rigidly affixed to the rest of the tool, is prone to frequent shock from contacting a untrue section of a rotating wheel rim that will push on the gauge and move it inadvertently out of alignment, causing inaccurate gauging and frustrating the truing procedure. Others suffer from flimsy and clumsy design, being composed of thin members prone to misalignment due to simple vibration from the turning wheel. Alignment of the gauge portion of the tools is tedious, requiring multiple adjustments of the support members for tools offering some maneuverability of the gauge, requiring changing the angular relationship between them while untightening and re-tightening thumb screws. Another major drawback of all of the truing tools cited above due to the rigid nature of the gauge indicator portions, which normally are conical tips or blade-like straight edges solidly connected to the rest of the tool. When in physical contact, these indicators will scratch or otherwise mar the surface finish of wheel rims, which are mostly composed of soft materials such as aluminum or carbon fiber composites, or even painted finishes. Finally, with the exception of Bartlett, Hsaio and Lynch, most of the cited frame-mountable truing tools are not compactly storable when not in use, and therefore not well suited for transporting while on biking outings where it is desirous to carry a minimal amount of gear.

SUMMARY

The present invention addresses the drawbacks pointed out above. One aspect of the present invention is to provide an effective minimalist tool for bicycle riders skilled in the art of wheel-truing. The present invention accomplishes this by providing a streamlined design resulting in compactness for carrying and storage, and effective use as a repair tool to be used in the field by riders with adequate wheel repair skills. The present invention offers all the necessary adjustments needed to correctly true a wheel while on the bicycle. It is designed to effectively true a laterally damaged wheel. However, a wheel that has a vertical "hop" will not be correctly fixed with the inventive tool. The concept and design of this tool is to serve as a compact and accurate lateral truing indicator while re-tensioning a damaged bicycle wheel. The inventive tool is an easily portable tool, which attaches to a bicycle's frame or steering fork for storage while riding. It has a series of adjustments which allow it to attach to any bicycle frame or fork, regardless of its designated use. Once attached the user can adjust the tool in order to find the area of the rim that is out of true and correctly adjust the spoke tension. The inventive tool offers four spatial degrees of freedom to maneuver and position the truing gauge portion of the tool. The inventive tool comprises a floating truing indicator tip design, in which the tip is manufactured from a soft polymer material, incorporating a spring-loaded tip, in order to decouple the tool from forces exerted by a rotating wheel with severe lateral deviations out of the plane of the rim (un-true rim). This maintains the initial alignment of the inventive tool, and allows for efficient and accurate truing of the damaged wheel. In addition, the floating soft tip avoids marring the surface of the rim while providing accurate truing. After a adjusting the spoke tension of the wheel, and using the inventive tool as an accurate guide, a wheel can be re-tensioned, therefore trued, while it is still mounted on the bicycle.

The inventive tool is comprised of seven main components using metal, plastic, and rubber materials. It also incorporates a spoke key, which is used to tighten the spoke nipple and increase or decrease the tension of the spoke. In doing so the outer rim of the wheel is pulled in one direction or another. The spoke key has three different sized slots to accommodate the three most commonly used spoke nipple sizes. In addition, the spoke key has an integrated feature of a 9 mm and a 10 mm box slot, which can be used to tighten or loosen 9 mm and 10 mm nuts on a bicycle.

The components of the inventive tool are designed to integrate themselves in a compact manner when the tool is not being used as is intended. That is, when stored or in transit, the components which comprise the tool are not functional, but they are secured. To use the tool, a person must partially disassemble the tool and re-configure the components to make it functional in its intended use.

DETAILED DESCRIPTION

One embodiment of the inventive tool is shown in an exploded view in FIG. 1. The tool embodiment is comprised of eight main components that are shown and labeled accordingly. The components are made with metal, plastic and rubber materials.

Figure 1A:
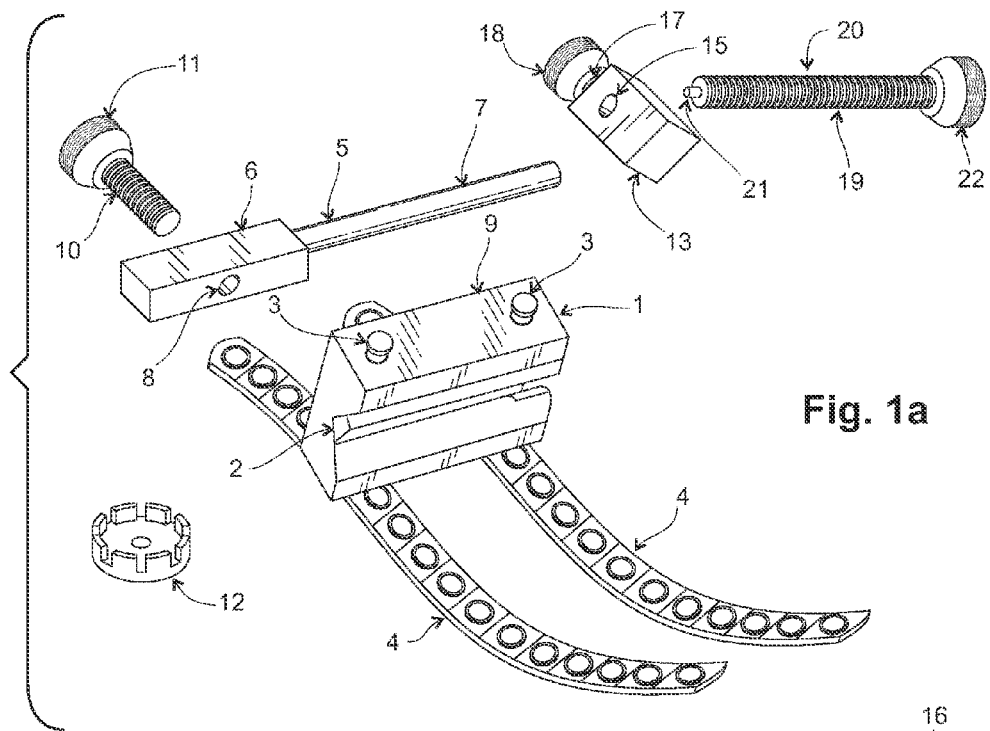
FIG. 1a illustrates all pieces of the inventive tool disassembled and labeled.

Referring to FIG. 1a, the inventive tool is provided with mounting base 1, which is attached to a frame member of a bicycle while in use. Mounting base 1 can be machined in virtually any practical shape from a variety of metal and polymeric materials. In the particular embodiment presently described, the base has a rectangular form factor. However, it is to be understood that the shape of the base is by no means limited to the presently described embodiment. It is a desired aspect of the present invention that at least a portion of the top surface be planar to accommodate further assembly components of the tool, as described in detail below. It is also a desired aspect of the present invention that at least part of the bottom surface of the base be non-planar to provide a greater contact area in comparison to a flat surface, engendering increased friction between the two opposing surfaces and resulting in a highly stable and secure attachment when fastened to a bicycle frame member of elliptical or circular cross-section. In the present embodiment of the invention shown in FIG. 1, V-shaped groove 2 spanning the bottom surface of the base along its long axis adequately accommodates elliptically-shaped bicycle frame members providing for a stable and secure attachment. The profile of the groove is by no means limited to a V-shape, and may encompass arbitrary non-planar shapes, such as various curved shapes to fit to elliptical and circular cross-sections commonly used for bicycle frame members. In the present embodiment, each side of the "V" has a 1 mm-thick rubber strip attached, which protect the bicycle frame member from abrasion during contact with the mounted base. Knobbed cleats 3 are provided on two of the sides of the base for facilitating attachment of rubber mounting straps 4 that secure the base to the bicycle frame. Knobbed cleats 3 are used as means of attachment for the mounting straps 4 in the present embodiment, but attachment means are in no way limited to this feature. Any suitable means of attachment securing the base to a bicycle frame member. In the present embodiment, the placement of cleats 3 is crucial to the stability of the base when secured to the bicycle frame member. Optimal placement of cleats 3 is near the opposite ends of the base provides for the most secure and stable mounting of the base.

The tool of the present invention is designed to be assembled by the bicyclist in the field. The assembly may be accomplished in any order; however, for purposes of illustration, a description of the progressive assembly of components starting from the mounting base 1 outward will serve as both a description of the tool as well as a description of the functional relationship of the components with each other and the inventive tool as a whole. Referring now to FIG. 2, extension rod 5, referred to herewith as a "slider rod" for purposes of description, is pivotally affixed to the top surface of mounting base 1. To this end, slider rod 5 comprises a flat base portion 6 and a cylindrical slider portion 7, and further comprises a non-threaded through-port 8 disposed along slider rod base 6 (see FIG. 1). In the present embodiment, the top surface of mounting base 1 has a flat machined profile so that slider rod 5 can pivot freely about its point of attachment in a plane parallel with the plane of the surface when assembled to the base. However, it is understood that in other embodiments of the present invention, the top surface may comprise more complicated profiles, as long as at least a portion of the top surface is planar. To accomplish the assembly, a threaded port 9 is provided on the top surface of the mounting base 1 for alignment with the through-port 8 disposed near the bottom of slider rod 5. Threaded port 9 engages with the threads of set screw 10 for securing slider rod 5 to mounting base 1. Furthermore, threaded port 9 may be a blind port or may be a through-port. The slider rod base 6 has a flat mating surface on the side which interfaces with mounting base 1, which allows for smooth pivoting when the set screw 10 is not tightened.

In the present embodiment, the set screw 10 is comprised of a plastic knurled knob 11 which is used for tightening/loosening with fingers. The threaded shank of the set screw 10 is also long enough to pass through the thickness of the slider rod base 6 and through the spoke wrench 12, to thread into the mounting base 1 for compact storage of the inventive tool.

Incorporated in the inventive tool's ability to create an indication of an un-true area of a wheel, is the device which will turn the spoke's nipple, which will increase or decrease the spoke tension. As understood by those skilled in the art, this is a metal spoke wrench 12 which, when not in use, is incorporated as an assembled component in the inventive tool (see FIG. 5b). When the inventive tool is in use, the spoke wrench 12 is used independently to turn the spoke nipples, or a 9 mm or 10 mm nut, which may be attached to the bicycle. The key features of the spoke wrench 12 are three sized slots, cut out of the perimeter of the spoke wrench. For each slot that is cut out, there is a matching slot of the same size diametrically opposite. The measurements of each cut out around the perimeter of the spoke wrench 12 are as follows: 0.127 inch (3.226 mm), 0.130 inch (3.302 mm) and 0.136 inch (3.454 mm). There are two extra relief cuts measuring 9 mm and 10 mm, both cuts disposed 180 degrees from each other. These two relief cuts allow the slider rod base 6 to sit within the spoke wrench when all is assembled in its compact form.

Centered in the spoke wrench is a non-threaded port in which the set screw 10 passes through.

Figure 1B:
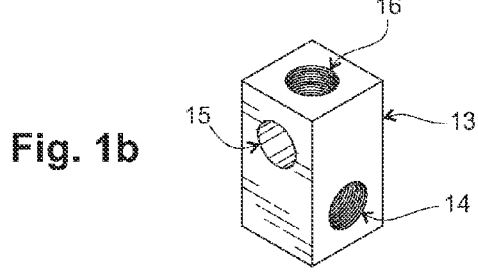
FIG. 1b shows view of adjustor head for details of port layout.
Figure 2:
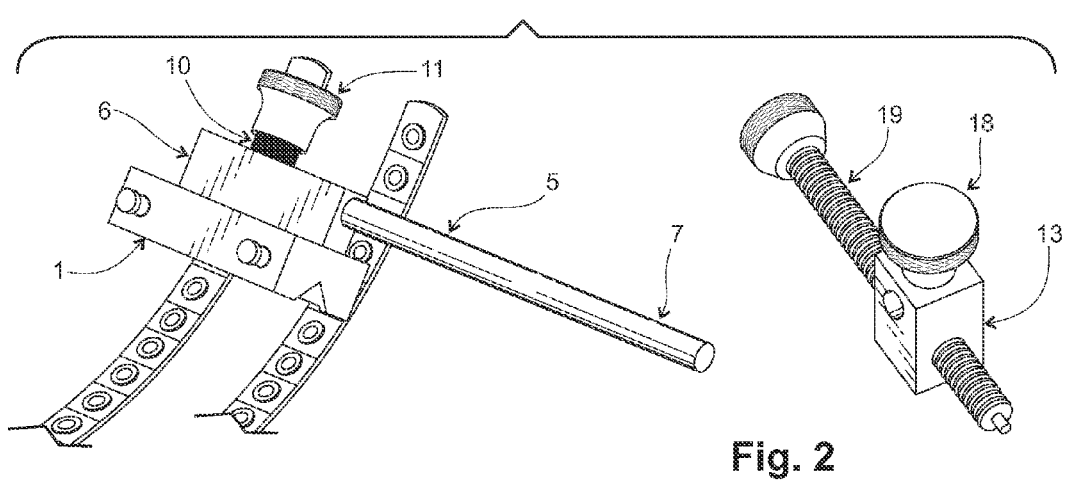
FIG. 2 shows partial assembly of inventive tool.

Referring to FIG. 1*b*, truing gauge support element 13, referred to herewith as the "adjustor head" for the purposes of description, comprises three ports, each port being disposed on three separate sides of the body of the adjustor head 13 in the present embodiment, the long axes of which are generally disposed orthogonally. Two of the ports are through-ports, of which one is a threaded through-port 14 and the other is a non-threaded through-port 15. A third threaded port 16 is bored partially through the body of adjustor head 13 in an orthogonal orientation with respect to non-threaded through-port 15 to communicate with threaded through-port 15. In the present embodiment, the adjustor head has a rectangular form factor; however, it is to be understood that this is not to be construed as a limitation, and that other form factors such as cylindrical are equally valid. Furthermore, in other embodiments of the present invention, the number, type and arrangement of ports may be varied to accommodate other permutations of design, and are by no means limited to the configuration of the present embodiment.

Figure 3:
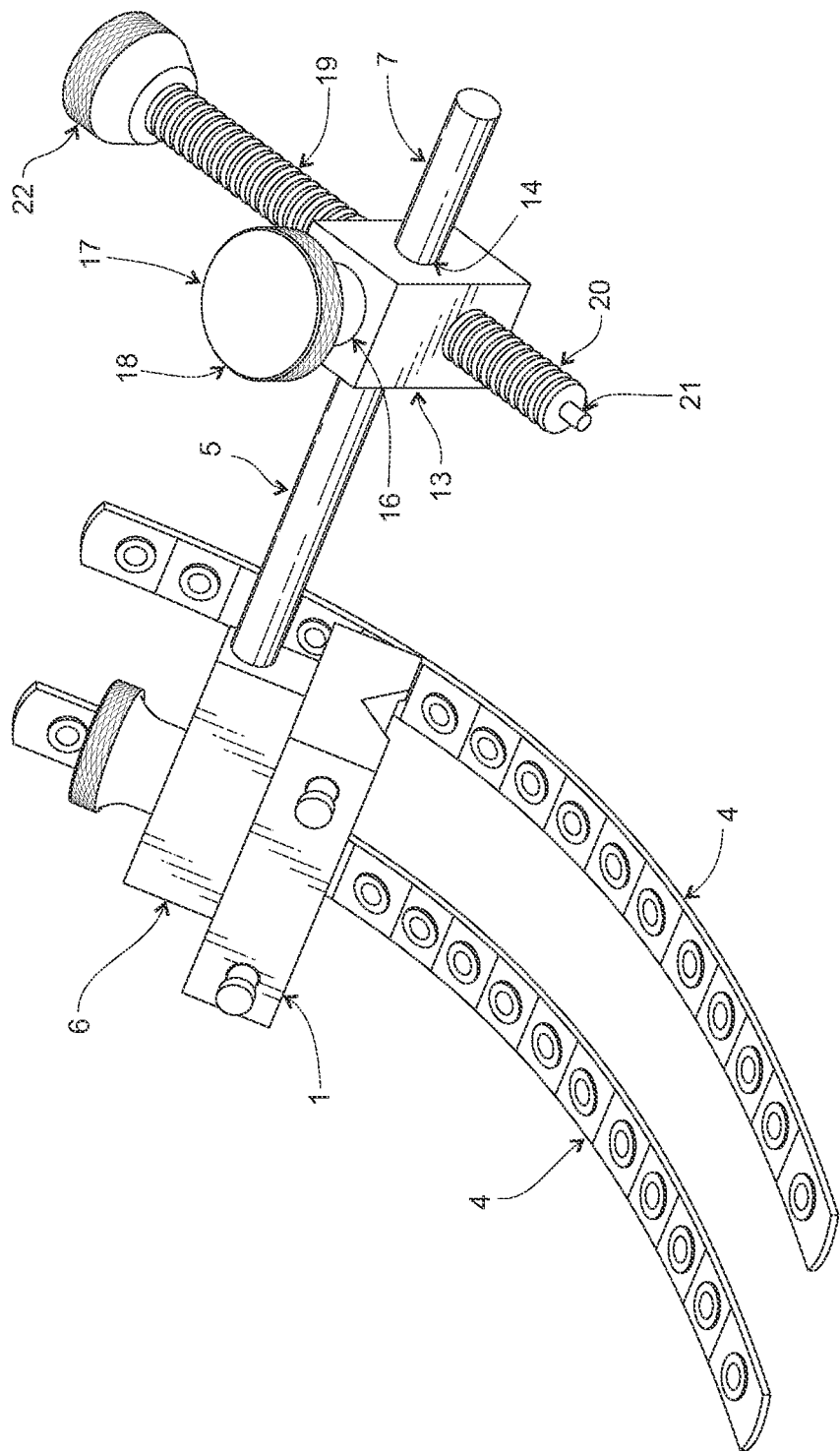
FIG. 3 shows the inventive tool fully assembled.

Referring now to FIG. 3, through-port 14 allows dynamic engagement of adjustor head 13 with cylindrical portion 7 of slider rod 5. In the present embodiment, adjustor head 13 is designed to freely slide and rotate along and about, respectively, the long axis of slider rod 5. It is to be understood that the present embodiment is in no way a limitation to the method of dynamic engagement of the adjustor head 13 with portion 7 of slider rod 5 in that other embodiments of the present invention may comprise a lead screw or a rack gear of a rack and pinion slide system. Referring again to the present embodiment, once positioned along slider rod 5 and rotated to a desired orientation, adjustor head 13 may be immobilized and secured on slider rod 5 by means of threaded port 16 engaging set screw 17 to tighten against slider rod cylindrical portion 7. Set screw 17 is comprised of a plastic knurled knob 18 which is tightened/loosened by fingers. The shank of set screw 17 is long enough to thread through the top portion of the adjustor head 13 and come in contact with the slider rod 5. The combination of the pivotal action of slider rod 5 and the linear and rotational motion of adjustor head 13 provide the first three spatial degrees of freedom to adjust the inventive tool.

The purpose of adjustor head 13 is to carry the truing gauge component of the inventive tool. In the present embodiment, the truing gauge 19 comprises an externally threaded cylindrical body 20 with an indicator probe 21 movably attached to one end by a spring means, and a knurled knob 22 disposed on the opposite end. The indicating end of truing gauge 19 comprises a spring-loaded means of attachment for indicator probe 21 to truing gauge 19. In the present embodiment, the spring-loaded means of attachment may comprise a coil spring (not shown). As shown in FIG. 3, indicator probe 21 is attached to the body 20 of truing gauge 19 via the spring-loaded means of attachment (coil spring) being affixed to the base of a lumen or cavity counter-bored into the indicating end of the truing gauge 19. In the present embodiment, the opposite end of the coil spring is attached to indicator probe 21, which is then able to retract into the lumen upon contact with a wheel rim in order to decouple the inventive tool from deflective forces encountered by the tip of probe 21 when in contact with a rotating uneven wheel rim. The latter situation would have a tendency to cause misalignment of a truing gauge by pushing an otherwise rigidly built tool away from the rim and destroying the accuracy and efficiency of the truing procedure. Other embodiments of spring-loading the indicator tip 21 are conceivable, including, but not limited to, a cantilever spring is used in place of a coil spring to bring about the same result.

The diameter and thread of truing gauge body 20 is chosen to mate with threaded through-port 14 on adjustor head 13. By example of the present embodiment, truing gauge 18 is dynamically engaged with adjuster head 13 by threading through threaded through-port 14. A fourth spatial degree of freedom is thus imbued to the inventive tool by the ability to advance the indicator probe 21 by manually turning the truing gauge 19 by means of knurled knob 22 to advance or retract indicator probe 21 from the wheel rim for final positioning before commencing the truing procedure. This present embodiment is not to be construed as a limitation on the manner by which the truing gauge may be advanced; other methods may be employed to the same end, including but not limited to, lead screw drives, rack and pinion drives and worm gear drives.

The body of the truing gauge 20 is intended to provide a fine adjustment that can be used when to approach indicator probe 21 towards an un-true area on a rim, or back off from same. Knurled knob 22 can be easily turned by the user's fingers. As the truing gauge 19 threads toward the rim that is being trued, the tip of indicator probe 21 will eventually come in contact with the rim. The inventive tool is designed to not further damage the rim by marring it when contact is made, and in the present embodiment, indicator probe 21 comprises comprises a plastic tip that is intended to provide a non-scratching or non-marring point of contact to the wheel rim. Spring-loaded probe 21 thus "floats" on the wheel rim. If a portion of a rotating wheel rim that is severely bent out of the plane of the rim rubs against the tip of plastic probe 21, it will push indicator probe 21 and compress it against the spring resistance, causing it to retract into the truing gauge body 20. This action will decouple the force of the rim from the rest of the inventive tool, maintaining the tool's initial alignment. In the present embodiment, the indicator probe tip may be made from Delrin, but those skilled in the art will appreciate that any suitable soft yet rigid material, such as another rigid polymer, can be substituted. In general, any material that can be characterized by a value of less than 100 on the Shore D hardness scale can be used to make the tip, encompassing most polymers and some metals.

Example of Use of the Inventive Tool

Deployment.

Figure 4A:
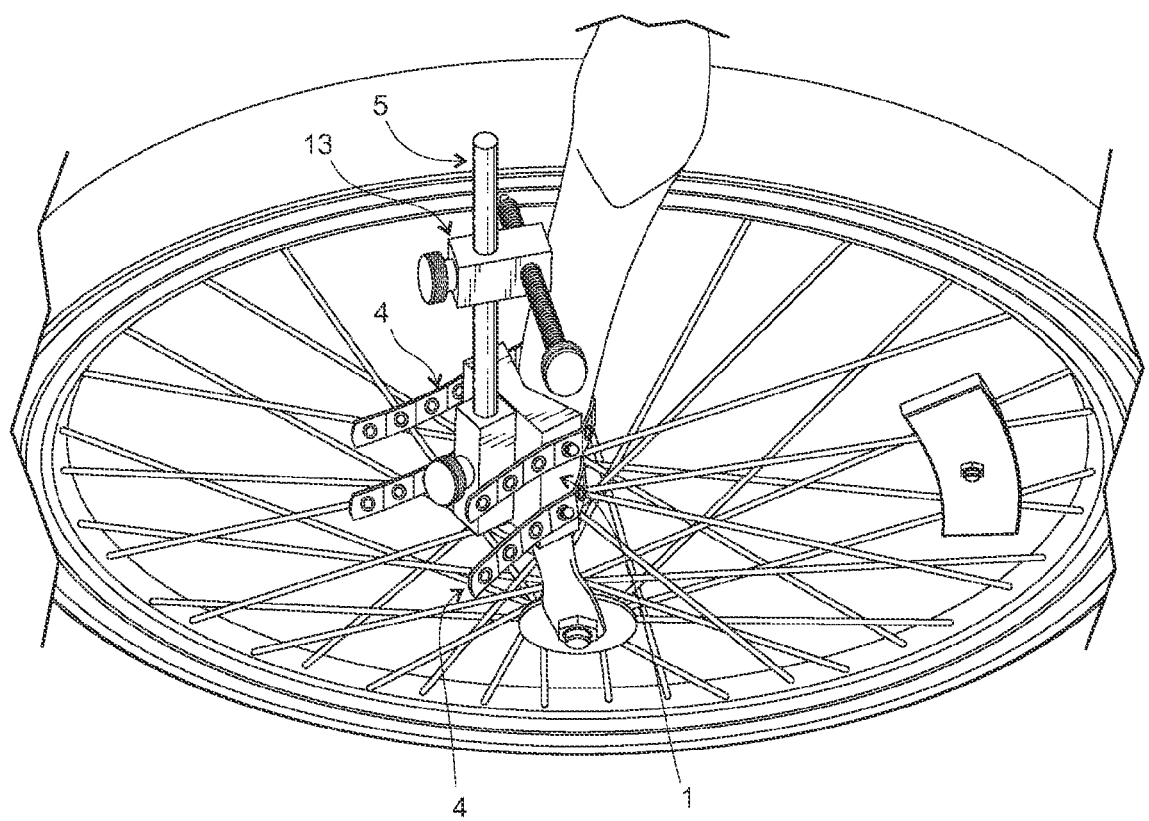
FIG. 4a illustrates view from side angle of inventive tool deployed on the front fork of a bicycle.
Figure 4B:
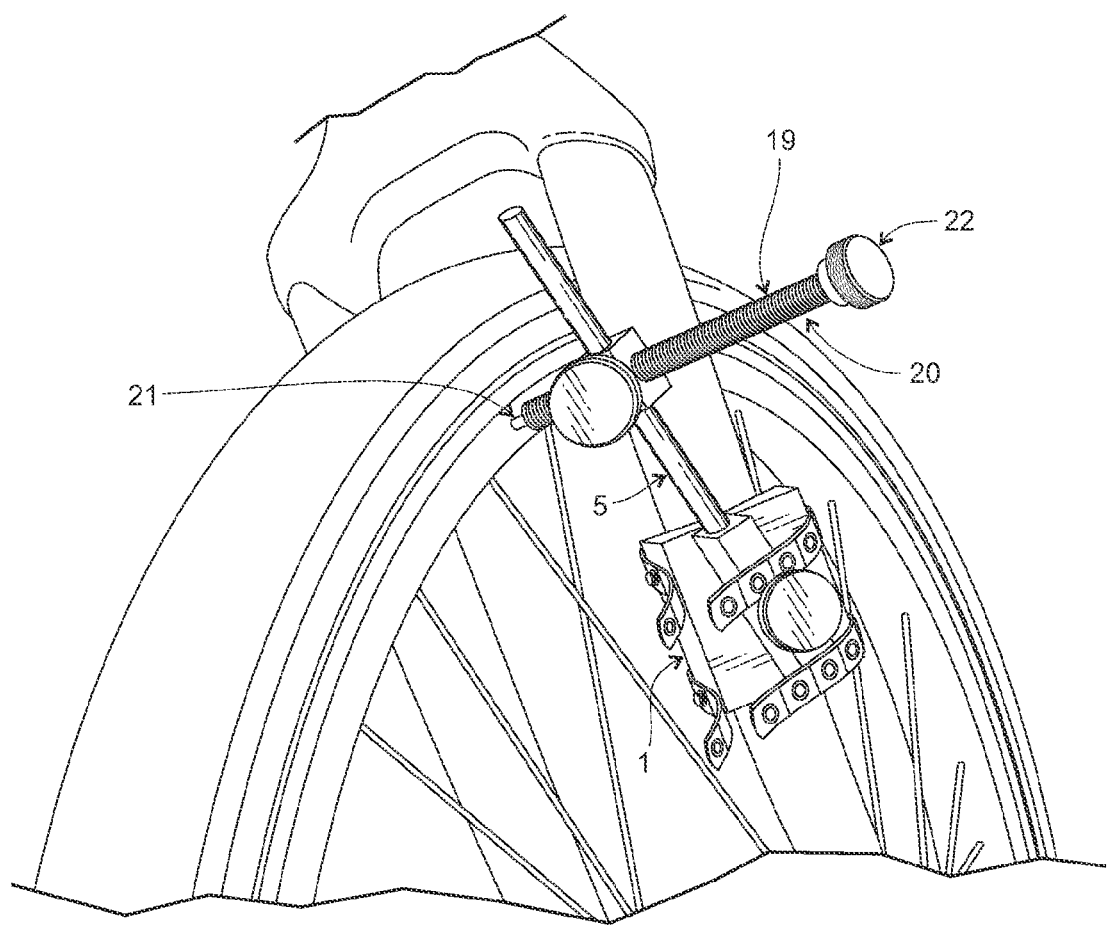
FIG. 4b illustrates view from higher angle of inventive tool deployed on a the front fork of a bicycle.

The deployment of the inventive tool is illustrated in FIG. 4*a* and FIG. 4*b*. The view in FIG. 4*a* shows the inventive tool is positioned on the fork of a bicycle so that the distance from the pivot point of sliding rod 5 to the wheel rim does not exceed its length. Mounting base 1 is secured against the fork with rubber straps 4, which are pulled tight around the fork and hooked onto cleats on the opposite side of the base 1. The V-groove on the bottom surface of the mounting base is shown abutted to the bicycle fork on the minor radius of the elliptical cross-section for the most stable and secure mounting. Sliding rod 5 is pivoted into position to allow adjustor head 13 to be raised to the level of the wheel rim and rotated so that the axis of truing gauge 19 is perpendicular to the rim. The view in FIG. 4*b* shows more clearly the truing gauge indicator probe 21 brought into contact with the wheel rim by turning the body 20 of the truing gauge using knurled knob 22.

To attach the mounting base 1 of the inventive tool to the bicycle, position the base along the bicycle's chainstay, seat-stay, or fork. The base should be about 1-2 inches down the chain/seat-stay or fork, towards the hub of the bicycle, from the rim. The "knob-like" cleats 3 will be running parallel with the "stay" or fork leg. Attach one of the rubber straps 4 by pushing the rubber strap thru one of the cleats on the base. While wrapping around the "stay" with one rubber strap 4, make sure the strap is being stretched to create enough tension to secure the base in place while the inventive tool is in use. Secure the other end of the strap to the other cleat 3 which is on the same linear plane. Using the second rubber strap 4, attach it to one of the remaining cleats which do not have a strap 4 already secured. While wrapping around the "stay" with the rubber strap, make sure the strap is being stretched to create enough tension to secure the mounting base 1 in place while the inventive tool is in use. Secure the other end of the strap to the cleat 3 which is on the same linear plane.

Figure 5A:
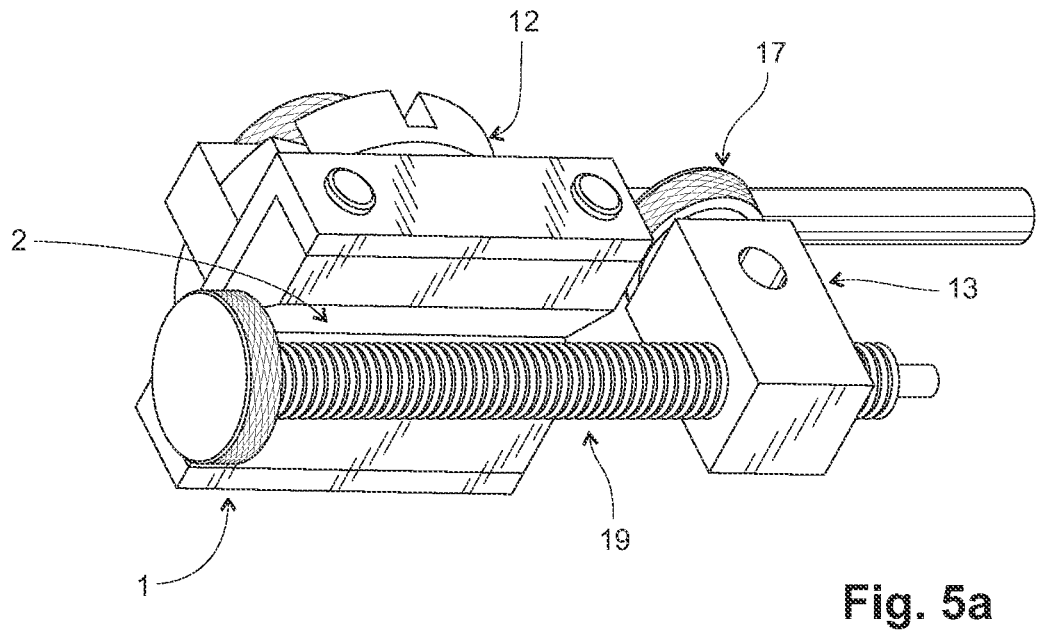
FIG. 5a shows inventive tool disassembled with stacking arrangement of components for storage or transport in kit form.
Figure 5B:
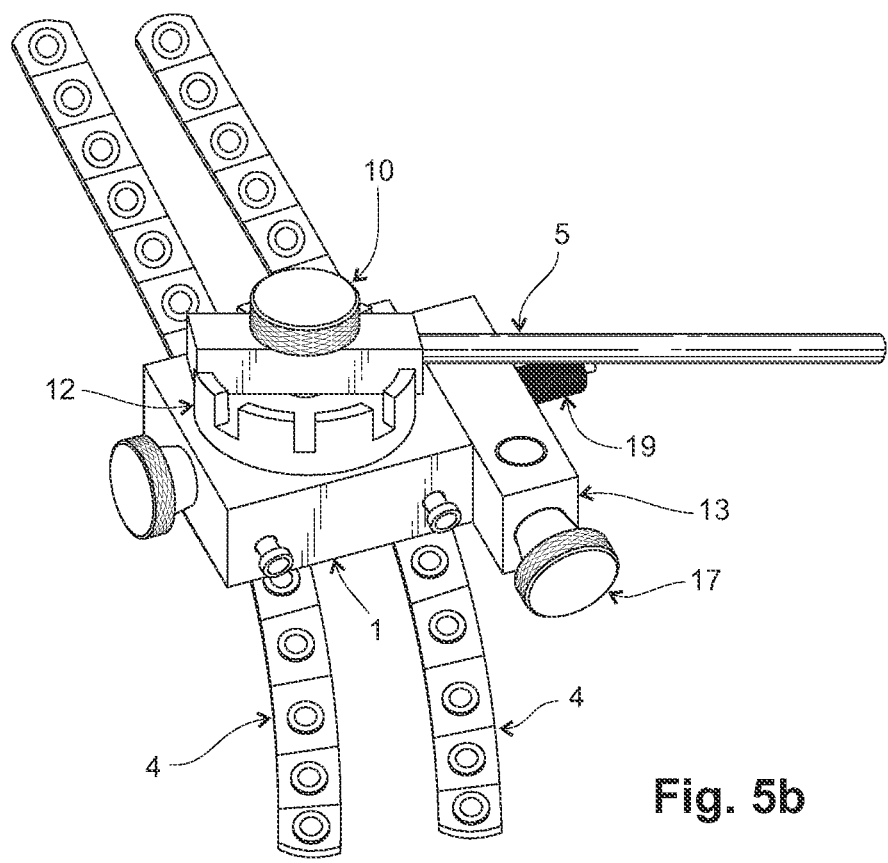
FIG. 5b shows top view of the inventive tool kit configuration.

Storage. When not in use truing gauge 19 can be stored and secured within the V-groove 2 of mounting base 1 as a partial assembly with adjustor head 13 secured to the body 20 of truing gauge 19 using set screw 17. This is shown in FIG. 5*a*. Truing gauge 19 can be further secured by attaching the rubber mounting straps 4 across the underside of the mounting base 1 of the inventive tool (not shown). In FIG. 5*b*, a top view of the inventive tool assembled as a kit with all nine components, including spoke wrench 12, in a stacked configuration for compact storage and ease of transport. The tool kit comprises mounting base 1, spoke wrench 12, slider rod 5, truing gauge 19, adjustor head (truing gauge support element) 13, set screws 10 and 17, and straps 4.

The above description of the present embodiment of the inventive tool is for illustrative purposes. It will be understood that various changes in the details, materials and arrangements that have been described and illustrated in order to explain the nature of the invention may be made by those skilled in the art within the principle and scope of the invention as expressed in the appended claims.

The invention claimed is:

1. A wheel truing gauge tool for providing a gauge for truing the out-of-plane deformation of the rim of a spoked wheel, comprising:
   (i) a mounting base member having a top surface and a bottom surface, the bottom surface adapted to attach to a structural member of a bicycle frame;
   (ii) a slider rod having a long axis, said slider rod being pivotally affixed to said top surface of the mounting base member;
   (iii) an adjustor head member having a first through-port through which the slider rod extends, whereby the adjustor head member is slideably and rotationally engaged along said slider rod, and a second through-port, the second through-port having an internal helical thread,
   (iv) a truing gauge member having a cylindrical body comprising a first end and a second end, a central axis extending from the first end to the second end, and an exterior surface having an external helical thread extending at least partially along the length cylindrical body, said truing gauge member movably affixed to said adjustor head member by engagement of the external helical thread of the truing gauge member with the internal helical thread of the second through-port of said adjustor head member, whereby rotation of the cylindrical body of the truing gauge member moves the truing gauge member relative to the adjustor head member axially along the length of the cylinder body of the truing gauge member; and
   (v) an indicator probe pliantly affixed to the first end of the truing gauge member through an intervening compliant member, said intervening compliant member having a first end and a second end, whereby the first end of said intervening compliant member is affixed to the truing gauge member and the second end of said intervening compliant member is affixed to the indicator probe in such a way that the indicator probe protrudes from the first end of the truing gauge member.

2. The wheel truing gauge tool of claim 1, wherein the intervening compliant member is a spring means.

3. The wheel truing gauge tool of claim 2, wherein the spring means is a coil spring.

4. The wheel truing gauge tool of claim 2, wherein the spring means is a cantilever spring.

5. The wheel truing gauge tool of claim 1, wherein the adjustor head member further comprises a fastening means for securing and immobilizing the adjustor head member to the slider rod.

6. The wheel truing gauge tool of claim 5, wherein the securing means for securing and immobilizing the adjustor head member to the slider rod is a set screw.

* * * * *